United States Patent [19]

Turner

[11] Patent Number: 5,714,083
[45] Date of Patent: Feb. 3, 1998

[54] A NON-FLAMMABLE REFRIGERANT FLUID CONTAINING HEXA FLUOROPROPANE AND HYDROCARBONS

[76] Inventor: Donald E. Turner, 750 Lakeside Dr., Suite E, Mobile, Ala. 36693

[21] Appl. No.: 585,479

[22] Filed: Jan. 11, 1996

Related U.S. Application Data

[63] Continuation-in-part of Ser. No. 380,640, Jan. 30, 1995, abandoned.

[51] Int. Cl.$^6$ .................................................. C09K 5/04
[52] U.S. Cl. ........................... 252/68; 252/67; 62/114
[58] Field of Search .......................... 252/67, 68; 62/114

[56] References Cited

U.S. PATENT DOCUMENTS

| | | | |
|---|---|---|---|
| 5,104,560 | 4/1992 | Huster et al. | 252/67 |
| 5,254,280 | 10/1993 | Thomas et al. | 252/68 |
| 5,372,737 | 12/1994 | Spauchus | 252/68 |

FOREIGN PATENT DOCUMENTS

| | | |
|---|---|---|
| 3-93888 | 4/1991 | Japan. |
| 4-288452 | 10/1992 | Japan. |
| 2228739 | 9/1990 | United Kingdom. |

*Primary Examiner*—Christine Skane

[57] ABSTRACT

A refrigerant fluid which is non-flammable, non-toxic, non-corrosive, ozone-safe and odorless comprising mixtures of: (1) one or more hydrocarbons having C-1 through C-6 molecular make-up; (2) fluorocarbon 1216, having the CAS designation 116-15-4; and (3) a friction modifier made of severely hydrotreated light naphthenic distillate (petro.) having the CAS designation 64742-53-6.

16 Claims, 3 Drawing Sheets

T-25

Blend FC 1216/Hydrocarbons

Blend 96% FC 1216 3% Hydrocarbons 1% FM

T-60
Blend FC 1216/Hydrocarbons

Blend 96% FC 1216 3% Hydrocarbons 1% FM

T-25/T-60
Blend 1.5% T-25/ 1.5% T-60

Blend 96% FC 1216 3% Hydrocarbons 1% FM

A NON-FLAMMABLE REFRIGERANT FLUID CONTAINING HEXA FLUOROPROPANE AND HYDROCARBONS

This application is a continuation-in-part of U.S. Ser. No. 08/380,640, filed Jan. 30, 1995 and entitled "Refrigerant Fluid," which is hereby abandoned.

BACKGROUND OF THE INVENTION

This invention relates to the refrigeration gas field and more specifically to a new product replacement and substitution for the refrigerant known as R-12 or CFC-12 (Freon), which by 1995 will no longer be produced due to its destructiveness of the ozone layer and environment.

SUMMARY OF THE INVENTION

The invention is a mixture of hydrocarbon gases and liquids which when formulated result in a refrigerant product that performs quite similarly to CFC-12. The invention is non-flammable, non-toxic, non-corrosive and odorless. The invention is molecularly lighter than the CFC-12 and includes hydrocarbon friction modifiers which enhance the refrigerant's effectiveness in an operating system.

It is known that some hydrocarbons have thermodynamic properties conducive to performing in refrigeration systems with excellent efficiency. A serious drawback is that hydrocarbons are generally thought to be flammable. However, a number of hydrocarbons in combination with other fluids are non-toxic and non-flammable. The present invention utilizes some of these non-flammable mixtures as a non-flammable refrigerant.

Friction modifiers are incorporated into the invention. The friction modifiers serve to stabilize the boiling and condensation temperatures of the refrigerant as well as to provide lubricity within the operating system and dissolving of old refrigerant oils.

The invention involves the mixing of various combinations of hydrocarbons C-1 through C-6 (standard chemical formulation), not more than six per cent (6%) of the mixture's weight, and fluorocarbon 1216 (FC-1216, Chemical Abstracts registry number CAS 116-15-4), not less than ninety-one per cent (91%) nor more than ninety-eight and eight-tenths per cent (98.8%) of the mixture's weight, creating a homogeneous non-flammable mixture with no chlorofluorocarbons ("CFC's") or toxic components. To this base refrigerant gas is added a small quantity, two-tenths per cent (0.2%) to five per cent (5%) by weight, of friction modifier. The result is a near azeotropic liquid refrigerant product with an almost constant maximum and minimum boiling point.

The preferred form of a hydrocarbon for refrigerant purposes is liquid, normally held in such liquid state by pressure. N-butane (natural butane) and isobutane are readily miscible with FC-1216 and will create a near azeotropic mixture, that is a refrigerant mixture that does not combine chemically yet provides refrigerant characteristics. The invention does not separate in the refrigeration system as it changes from liquid to gas and back to liquid, as it collects and releases heat.

In a preferred embodiment, FC-1216 is approximately ninety-six percent (96%) by weight of the ultimate refrigerant mixture with an additional approximately three percent (3%) by weight comprising equal parts of n-butane and isobutane, to which a severely hydrotreated light naphthenic distillate (petro.) having Chemical Abstracts registry number CAS 64742-53-6 ("FM") of approximately one percent (1%) by weight is added to serve as a friction modifier, with other multiple functions associated therewith as stated hereinafter. This creates a non-flammable hydrocarbon mixture suitable for refrigeration use. This homogeneous mixture is efficient in automobile compressors, refrigerators, coolers, vending machines, and other refrigerant/heat transfer systems. Wherever CFC-12 had been used, this invention can be used as a substitute. The invention will perform without any retrofit of the mechanical system or changing of condenser or evaporator size.

Petroleum based friction coefficient reduction technology is not new in the industry with regard to metal-to-metal contact, such as lubrication of machinery parts. However, the mixing of friction modifiers with refrigerant gases themselves is new technology. The friction modifiers in this invention alter the boiling point of the refrigerant gas mixture, creating a miscible, homogeneous product that is near azeotropic. The friction modifiers serve multiple purposes. The friction modifiers are non-flammable and further retard the flammable components. The modifiers stabilize the viscosity of the refrigerant as it vaporizes. The friction modifier prevents corrosion, neutralizes acid, and reduces foaming within a refrigerant system, as well as providing anti-wear properties in the system.

DETAILED DESCRIPTION OF THE INVENTION

There are hundreds of hydrocarbon gases which could be considered for refrigerant use. The knowledge base about how and why refrigeration works has been well studied and engineered. The CFC-12 systems were designed specifically for the efficiency of the CFC-12 refrigerant. With the elimination of CFC gases, which contain chlorine, it was natural to re-examine previous "naturally" occurring refrigerants. For example, propane in a pure form works well as a refrigerant, as does ammonia and butane. However, a refrigerant must also be safe to handle, ship, and install, and propane, ammonia and butane by themselves lack such safety because of their flammability. The refrigerant also must be safe for the occupants of automobiles and safe in confined or constricted areas. Furthermore, a refrigerant must be environmentally safe. CFC-12 is non-flammable, non-toxic, non-corrosive, and safe for the technician and the public, but because of its ozone destructiveness, it is being eliminated.

The development of the subject invention rests on the principle of achieving a formulation of hydrocarbon and derivative gases that have known refrigerant properties and using them in appropriate proportions and with appropriate additives and modifiers so as to achieve performance characteristics comparable to CFC-12, but without the environmental problems associated with CFC-12. It was found that certain of these gases in certain combinations and proportions do in fact closely parallel the vapor pressure/temperature ratio curve of CFC-12. In development of the subject invention there are three macro components (some of which are themselves blends or mixtures) which when mixed together in varying quantities yield a range of refrigerant products. The components are:

Hydrocarbon blend, T-25 and/or T-60 (as described below)
FC 1216
FM

The hydrocarbon blends T-25 and T-60 consist of n-butane, isobutane, ethane, isopropane, propane and hexane. Selected examples of mixture ratio percentages are shown in Tables 1 and 2. FC-1216 is non-flammable, non-toxic, non-corrosive, non-carcinogenic, ozone-safe, with chemical formula $C_3F_6$ and blends well with T-25 and/or T-60 to form a near azeotropic homogeneous blend refrigerant. The friction modifier is a severely hydrotreated, solvent-washed, de-waxed, light naphthenic based petroleum distillate having the unique CAS designation 64742-53-6 and designated as FM.

TABLE 1

| T-25 Blend Components By Liquid Volume | |
| --- | --- |
| Methane C1 | 0.11420 |
| Ethane C2 | 2.01420 |
| Hexane C6 | 0.00650 |
| Propane C3 | 50.46100 |
| Iso Butane iC4 | 10.35400 |
| N Butane nC4 | 36.11410 |
| Iso Pentane nC5 | 0.13700 |

TABLE 2

| T-60 Blend Components By Liquid Volume | |
| --- | --- |
| Methane C1 | 0.11420 |
| Ethane C2 | 2.01420 |
| Hexane C6 | 0.00650 |
| Propane C3 | 36.11410 |
| Iso Butane iC4 | 10.35400 |
| N Butane nC4 | 50.46100 |
| Iso Pentane nC5 | 0.13700 |

Figure 1:
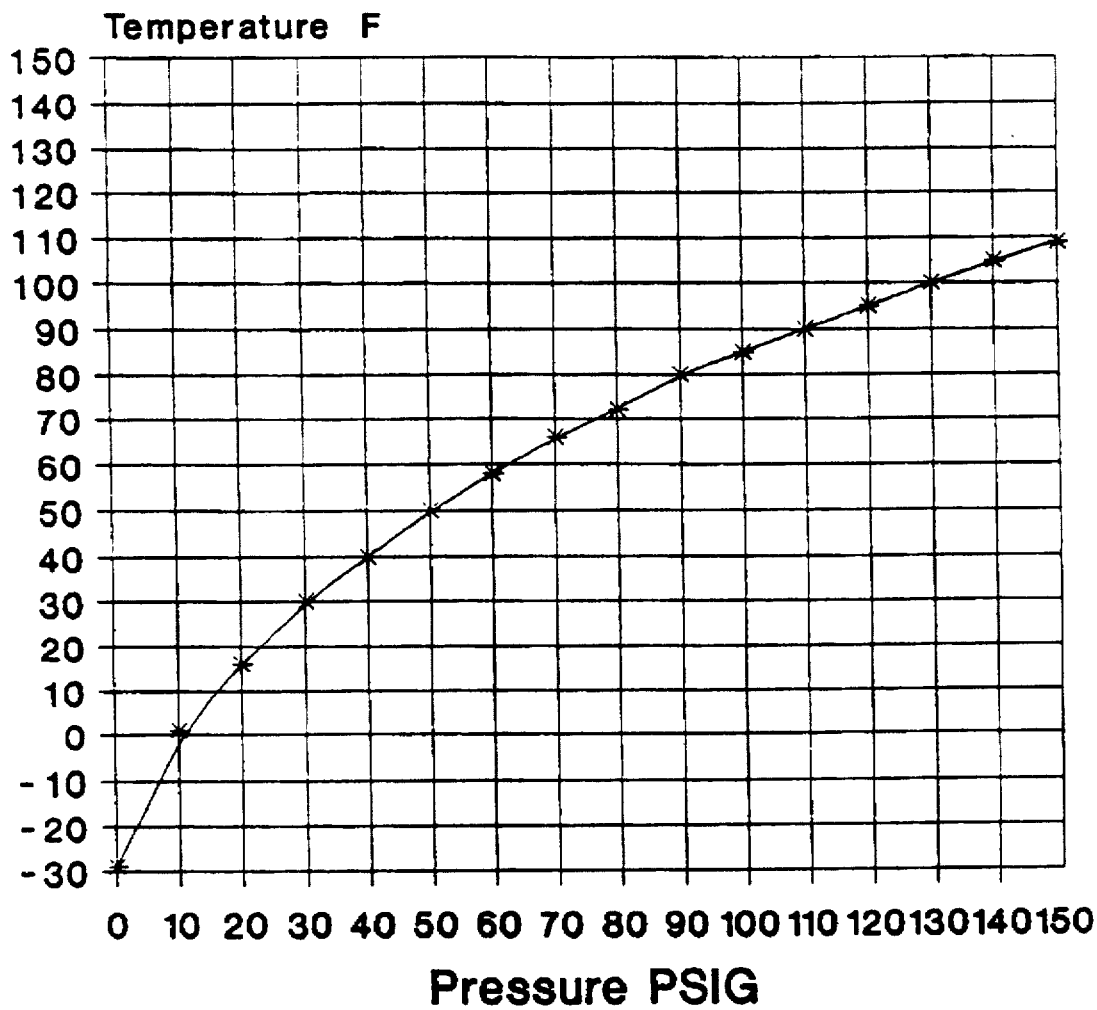
FIG. 1 is a graph which shows the temperature/pressure curve for a blend of FC1216 and hydrocarbons.
Figure 2:
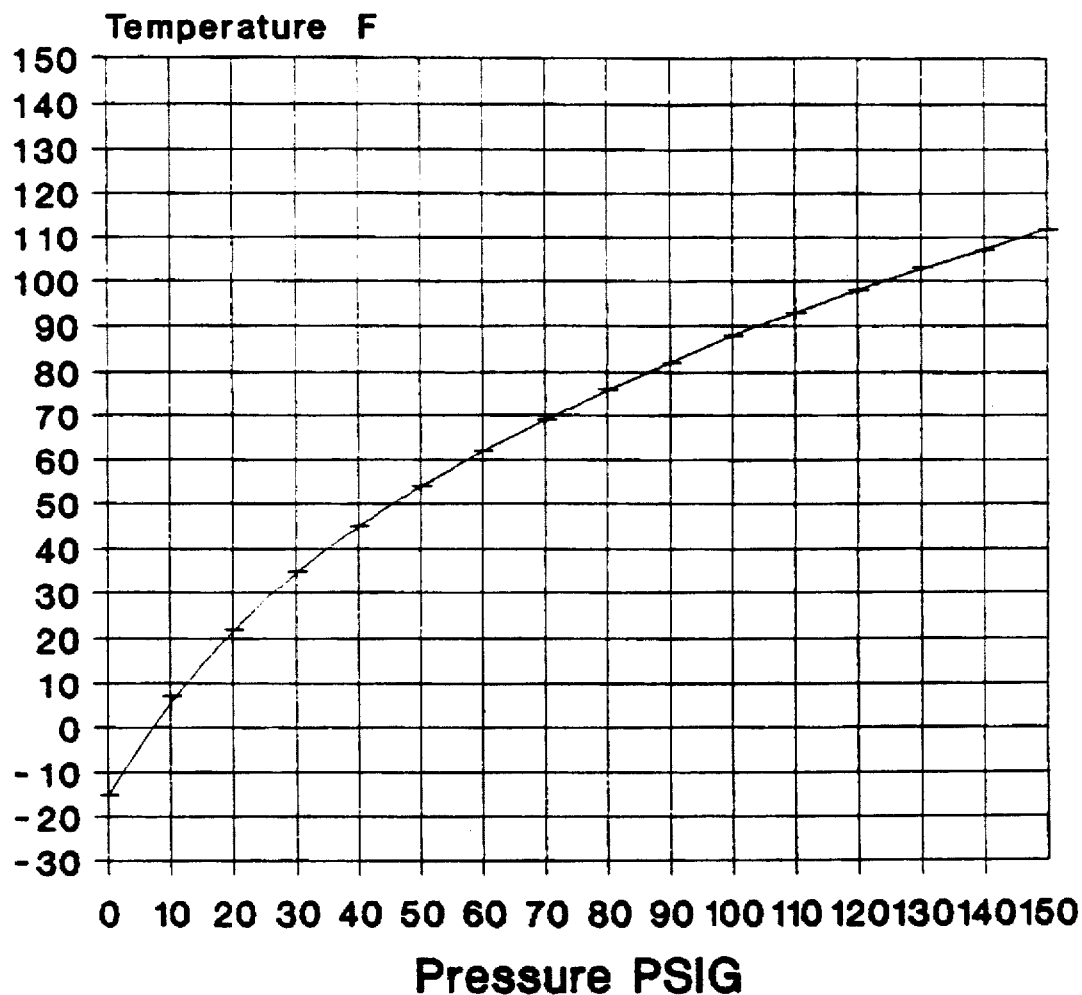
FIG. 2 is a graph which shows the temperature/pressure curve for a blend of FC1216 and hydrocarbons.
Figure 3:
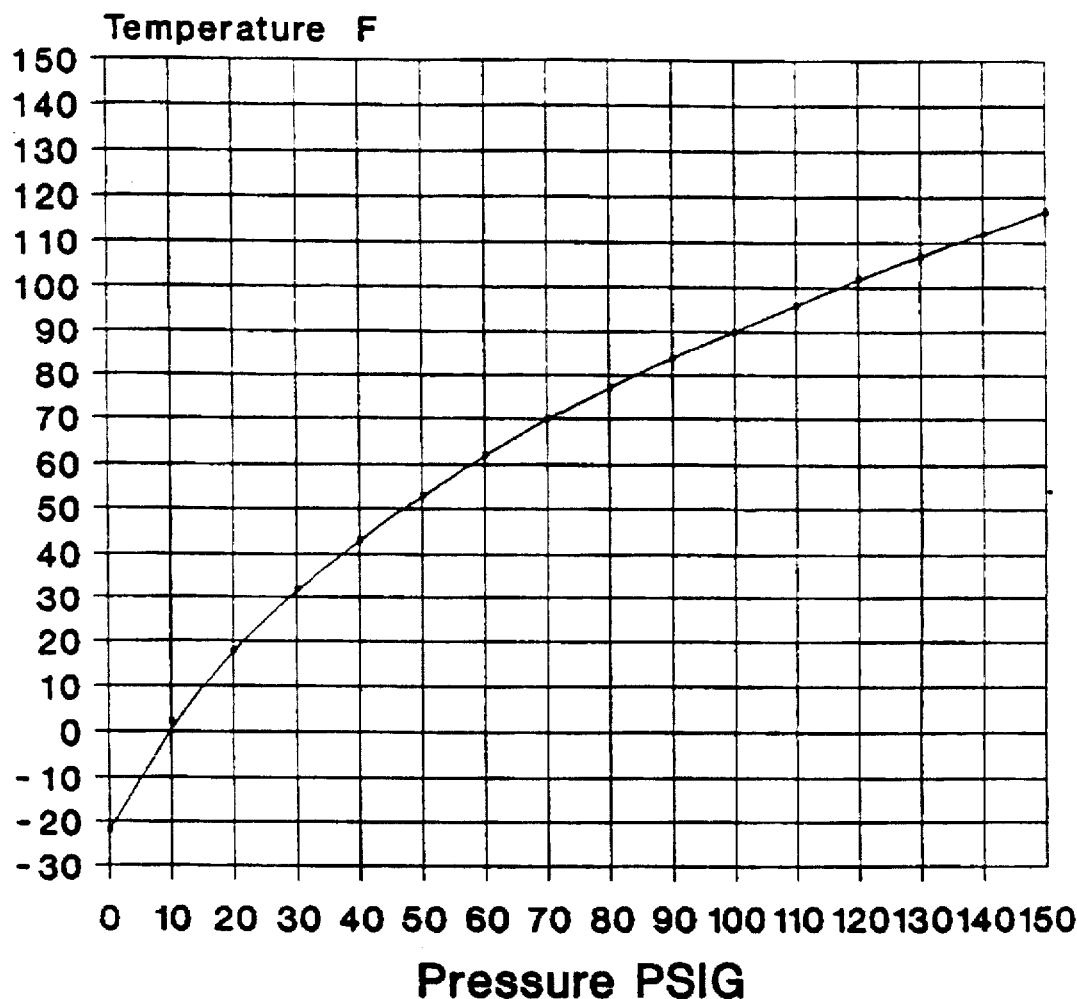
FIG. 3 is a graph which shows the temperature/pressure curve for a blend of FC1216 and hydrocarbons.

Discovery of the invention led to the formulation and testing of many blends. Those with undesirable characteristics, including flammability, moisture content, and lack of miscibility were eliminated. Table 2 shows another of the blends covered by this invention, but by no means all of them. All blends of T-25, T-60, FC 1216, and FM are non-flammable. Representative pressure/temperature curves for T-25 blended with FC 1216 and FM, T-60 blended with FC 1216 and FM, and T-25 and T-60 in equal part combination blended with FC 1216 and FM, are shown in FIGS. 1 through 3. As discussed earlier, the addition of FM creates a near azeotrope, a stable refrigerant that vaporizes evenly. The pressure/temperature curves shown in FIGS. 1 through 3 closely approximate comparable curves for CFC-12.

Numerous blends were tested for flammability by a nationally and internationally recognized testing laboratory under rigorous underwriter laboratory specifications and were found to be non-flammable in the ranges covered by the present invention.

The hydrocarbons mixed in T-25 and T-60 have refrigerant qualities and were established as a base. Both mixtures are flammable, standing alone.

While studies have focussed on T-25 and T-60 blends, it has been found that any combination of $C_1$ to $C_6$ hydrocarbons will perform satisfactorily as a hydrocarbon blend within the refrigerant fluid if n-butane and propane, singly or in combination, constitute not less than eighty percent (80%) of the liquid volume of said hydrocarbon blend, to which can be added isobutane in a range of eight per cent (8%) to twelve percent (12%) by liquid volume of said hydrocarbon blend, to which may further be added small amounts, less than three percent (3%) of total liquid volume of any one or more of ethane, methane, hexane and isopentane.

To these hydrocarbon blends were added FC 1216 which is non-flammable and known to have refrigerant characteristics, to the point where the target mixture was non-flammable. The boiling points of T-25 and T-60 differ from each other and from FC 1216. By manipulation of the three variable gas mixtures, it could be precisely determined when separation of the gases would occur, i.e., when one would vaporize before another.

The final component of the mixture, naphthenic based FM, was added in a fraction of one percent to a total of three percent amounts by weight to the gas mixtures. FM was known to stabilize refrigerant mixtures by reducing flammability and increasing boiling points. Again, each mixture was manipulated to achieve a pressure/temperature curve nearly identical to CFC-12. The combinations of the blends form a near azeotrope. There is almost even evaporation of the blends during leak or bleed-off. The invention remains non-flammable during the entire process.

Differing degrees of refrigerant efficiency and other characteristics can be achieved by varying, within limits, the quantities of blend of T-25, T-60, FC 1216, and FM.

The combination of refrigerant gases and friction modifier creates a series of refrigerant blends which are suitable replacements for CFC-12. The refrigerants achieve the equivalent pressure/temperature curve; they are non-flammable, non-toxic, non-corrosive; are not harmful to the ozone layer; and are otherwise environmentally safe.

The friction modifier component changes the vapor pressure/temperature curves and boiling points so as to cause a near azeotrope. This is an advantage during a period of accidental leaking and cause even evaporation from the system.

The friction modifier has the ability to dissolve slowly the old refrigerant oil built up inside the condenser and evaporator tubes that greatly impairs the heat transfer of the refrigeration process. This old oil build up is held in suspension so as not to interfere with the filter and drier in the system.

The friction modifiers return the refrigerant oil back to the compressor for proper lubrication of the positive displacement compressor by viscosity stabilizers at lower temperatures, promoting better lubrication of the mechanical compressor.

The friction modifiers add film strength to the normally fragile compressor oil preventing metal to metal contact between moving metal parts in the compressor.

The friction modifier will greatly reduce wear on metal parts in the compressor by reducing friction coefficients.

The present invention is a replacement for CFC-12 refrigerants that have been determined to be harmful to the environment and the ozone layer. The invention works with the same efficiency of CFC-12, and does not require mechanical revision (retrofit) of refrigeration systems, and lacks the drawbacks of CFC's.

What is claimed is:

1. A refrigerant fluid mixture comprising:
   (a) a hydrocarbon blend comprising at least two hydrocarbons having C-1 through C-6 molecular makeup selected from the group consisting of methane, ethane, hexane, propane, iso-butane, n-butane, and isopentane, said blend present in said mixture in a range of 1% to 6% of the weight of said mixture;

(b) fluorocarbon 1216, also known as hexafluoropropene, said fluorocarbon present in said mixture in a range in the aggregate of 91% to 98.8% of the weight of said mixture; and (c) a lubricant consisting essentially of a severely hydrotreated light naphthenic distillate present in said mixture in a range of 0.2% to 5% of the weight of said mixture.

2. A refrigerant fluid as described in claim 1 wherein the hydrocarbon blend contains by liquid volume more than fifty percent (50%) propane and more than thirty-five percent (35%) n-butane.

3. A refrigerant fluid as described in claim 2 wherein the hydrocarbon blend contains by liquid volume more than eight percent (8%) isobutane.

4. A refrigerant fluid as described in claim 2 wherein the hydrocarbon blend contains by liquid volume more than one percent (1%) ethane.

5. A refrigerant fluid as described in claim 3 wherein the hydrocarbon blend contains by liquid volume more than one percent (1%) ethane.

6. A refrigerant fluid as described in claim 5 wherein the hydrocarbon blend contains in some amounts methane, hexane and isopentane.

7. A refrigerant fluid as described in claim 1 wherein the hydrocarbon blend contains by liquid volume more than fifty percent (50%) n-butane and more than thirty-five percent (35%) propane.

8. A refrigerant fluid as described in claim 7 wherein the hydrocarbon blend contains by liquid volume more than eight percent (8%) isobutane.

9. A refrigerant fluid as described in claim 7 wherein the hydrocarbon blend contains by liquid volume more than one percent (1%) ethane.

10. A refrigerant fluid as described in claim 8 wherein the hydrocarbon blend contains by liquid volume more than one percent (1%) ethane.

11. A refrigerant fluid as described in claim 10 wherein the hydrocarbon blend contains in some amounts methane, hexane and isopentane.

12. A refrigerant fluid as described in claim 1 wherein the hydrocarbon blend contains propane and n-butane in combination representing at least eighty percent (80%) of the liquid volume of said blend.

13. A refrigerant as described in claim 12 wherein the hydrocarbon blend contains by liquid volume more than eight percent (8%) isobutane.

14. A refrigerant as described in claim 12 wherein the hydrocarbon blend contains by liquid volume more than one percent (1%) ethane.

15. A refrigerant fluid as described in claim 13 wherein the hydrocarbon blend contains by liquid volume more than one percent (1%) ethane.

16. A refrigerant fluid as described in claim 15 wherein the hydrocarbon blend contains in some amounts methane, hexane and isopentane.

* * * * *

UNITED STATES PATENT AND TRADEMARK OFFICE
CERTIFICATE OF CORRECTION

PATENT NO. : 5,714,083
DATED : Feb. 3, 1998
INVENTOR(S) : Donald E. Turner

It is certified that error appears in the above-identified patent and that said Letters Patent is hereby corrected as shown below:

On the title page, in the title, Line 2, the word "-FLUOROPROPANE-" is to be deleted and should read - - FLUOROPROPENE - - .

Signed and Sealed this

Twenty-eighth Day of April, 1998

Attest:

BRUCE LEHMAN

Attesting Officer

Commissioner of Patents and Trademarks